US011873679B2

(12) United States Patent
Skold, Jr. et al.

(10) Patent No.: US 11,873,679 B2
(45) **Date of Patent: *Jan. 16, 2024**

(54) SYSTEM AND METHOD FOR RECTIFYING EXCESSIVE CLEARANCES OF DOOR ASSEMBLIES

(71) Applicant: National Guard Products, Inc., Memphis, TN (US)

(72) Inventors: Roger Paul Skold, Jr., Collierville, TN (US); Daniel Ray Tompkins, Cordova, TN (US)

(73) Assignee: NATIONAL GUARD PRODUCTS, INC., Memphis, TN (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/591,140

(22) Filed: Feb. 2, 2022

(65) Prior Publication Data

US 2022/0154525 A1 May 19, 2022

Related U.S. Application Data

(63) Continuation of application No. 16/597,423, filed on Oct. 9, 2019, now Pat. No. 11,261,653.

(60) Provisional application No. 62/878,944, filed on Jul. 26, 2019, provisional application No. 62/850,848, filed on May 21, 2019.

(51) Int. Cl.

| | |
|---|---|
| ***E06B 5/16*** | (2006.01) |
| ***E06B 7/232*** | (2006.01) |
| ***E06B 7/23*** | (2006.01) |

(52) U.S. Cl.
CPC .............. *E06B 7/232* (2013.01); *E06B 5/164* (2013.01); *E06B 7/2316* (2013.01); *E05Y 2900/134* (2013.01)

(58) Field of Classification Search
CPC ........ E06B 7/232; E06B 7/2316; E06B 5/164; E05Y 2900/134
See application file for complete search history.

(56) References Cited

U.S. PATENT DOCUMENTS

| | | | | |
|---|---|---|---|---|
| 2,105,164 A | | 1/1938 | Schlegel | |
| 3,604,152 A | | 9/1971 | Protzman | |
| 4,242,848 A | | 1/1981 | Schoultz | |
| 4,384,429 A | | 5/1983 | Rokicki | |
| 5,168,669 A | * | 12/1992 | Knapp | E06B 7/2316 49/470 |
| 5,244,709 A | | 9/1993 | Vanderstukken | |

(Continued)

FOREIGN PATENT DOCUMENTS

| | | |
|---|---|---|
| DE | 2841614 A1 | 4/1980 |
| DE | 2919951 A1 | 11/1980 |

(Continued)

*Primary Examiner* — Marcus Menezes
(74) *Attorney, Agent, or Firm* — K&L Gates LLP; Shu Chen

(57) ABSTRACT

Systems and methods for rectifying excessive bottom or head clearances of door assemblies are disclosed. An example system may comprise a door cap straight component installed on a first side of a fire door; a door cap L-shaped component installed on a second opposite side of the fire door; at least one intumescent strip seal fitted with the door cap L-shaped component; and end caps installed on two narrow ends of the fire door.

16 Claims, 15 Drawing Sheets

(56) References Cited

U.S. PATENT DOCUMENTS

| | | | | |
|---|---|---|---|---|
| 5,943,824 | A * | 8/1999 | Tatara | E06B 3/88 52/656.3 |
| 6,434,899 | B1 | 8/2002 | Fortin | |
| 6,442,901 | B1 | 9/2002 | Rissone | |
| 7,886,501 | B2 * | 2/2011 | Bartlett | E06B 3/88 52/800.1 |
| 9,051,731 | B2 | 6/2015 | Thomas | |
| 9,909,356 | B1 | 3/2018 | O'Keeffe | |
| 10,273,746 | B1 | 4/2019 | O'Keeffe | |
| 2002/0124497 | A1 | 9/2002 | Fortin | |
| 2005/0268559 | A1 | 12/2005 | Ellingson | |
| 2006/0248833 | A1 | 11/2006 | Autovino | |
| 2006/0272247 | A1 | 12/2006 | Bartlett | |
| 2007/0101655 | A1 | 5/2007 | Bartlett | |
| 2007/0261312 | A1 | 11/2007 | Kuppler | |
| 2008/0127596 | A1 | 6/2008 | Wildenhain | |
| 2009/0282760 | A1 * | 11/2009 | Sampson | E04F 15/02423 52/794.1 |
| 2011/0283627 | A1 | 11/2011 | Shaw | |
| 2011/0314755 | A1 | 12/2011 | Langille | |
| 2014/0260017 | A1 | 9/2014 | Noble | |
| 2015/0033646 | A1 | 2/2015 | Baumert | |
| 2015/0354267 | A1 | 12/2015 | Noble | |
| 2017/0267587 | A1 | 9/2017 | Abolt | |
| 2019/0078378 | A1 | 3/2019 | Raven | |
| 2020/0370363 | A1 | 11/2020 | Skold | |
| 2021/0032927 | A1 * | 2/2021 | Brown | E04B 1/948 |

FOREIGN PATENT DOCUMENTS

| | | | | |
|---|---|---|---|---|
| DE | 3001213 | A1 | 7/1981 | |
| DE | 4011607 | A1 | 10/1991 | |
| GB | 2268533 | A | 1/1994 | |
| GB | 2376706 | A * | 12/2002 | A62C 2/065 |
| GB | 2581201 | A * | 8/2020 | E06B 5/16 |

* cited by examiner

Side View

Perspective View

Front View 114
116
Side View 106
114
Perspective View

116

114
Front View

Side View

Front View

Perspective View 304
314
312
Perspective View

Side View
314
312

312
312

Top View
Front View

SYSTEM AND METHOD FOR RECTIFYING EXCESSIVE CLEARANCES OF DOOR ASSEMBLIES

CROSS-REFERENCE TO RELATED APPLICATIONS

The present application is continuation application of U.S. patent application Ser. No. 16/597,423, filed Oct. 9, 2019, which claims the benefit of U.S. Provisional Patent Application No. 62/850,848, filed May 21, 2019, and U.S. Provisional Patent Application No. 62/878,944, filed Jul. 26, 2019, the contents of both are incorporated by reference.

FIELD OF TECHNOLOGY

The present disclosure generally relates to system and method for rectifying excessive clearances of door assemblies, and more particularly relates to solutions for bringing fire doors that have excessive clearances (gaps) around them into compliance with various regulatory codes and standards.

BACKGROUND

A fire door is a door with a fire-resistance rating (sometimes referred to as a fire protection rating) used as part of a passive fire protection system to reduce the spread of fire and smoke between separate compartments of a structure and to enable safe egress from a building or structure or ship. Specifically, a fire door by building codes must have appropriate maximum clearances around its perimeter such that the fire door functions as desired to stop the flow of fire, hot gases, and smoke in order to minimize the risk and effects of fire and other hazardous situations. However, many fire doors in residential and commercial buildings, hospitals and schools fail installation and maintenance inspections due to excessive clearances around them. Fire doors may be rated by time (in minutes or hours) that a door can withstand exposure to fire test conditions. Typical ratings may include 1% hours (90 minutes), 1-hour (60 minutes), ¾-hour (45 minutes), and ⅓-hour (20 minutes), with the maximum rating required of any swinging type fire door being three hours (180 minutes).

Accordingly, there is a need for providing products and solutions that are designed and tested to rectify excessive clearances for fire doors in order to be code compliant.

SUMMARY

In one aspect, the present disclosure provides a system for rectifying excessive bottom clearances of door assemblies. The system may comprise a door sweep installed on a first side of a fire door; a door shoe installed on a second opposite side of the fire door; an intumescent seal in an opening between a bottom edge of the fire door and the door shoe or a floor surface; and end caps installed on two narrow side ends of the fire door. The system has been Underwriters Laboratories Inc. (UL) certified for up to 90 minutes for fire doors with bottom clearances up to 1½. In one embodiment, the door sweep may comprise a solid neoprene rubber seal fitted with a retaining plate. The system may further comprise means for securely fastening at least the door sweep, door shoe, and end caps to the fire door. The intumescent seal may be self-adhesive and made of TECNOFIRE® 2000. The door shoe may comprise an L-shaped door shoe having a vertical portion and a horizontal portion to wrap around the bottom edge of the fire door with an opening between the bottom edge of the fire door and a top side of horizontal portion. The intumescent seal may be positioned on the top side of the horizontal portion of the door shoe. Each of the end caps may cover an opening between the bottom edge of the fire door and the horizontal portion of the door shoe on either narrow side end of the fire door.

In another aspect, the present disclosure discloses a system for rectifying excessive bottom clearances of door assemblies. The system may comprise a door sweep installed on either side of a fire door; an intumescent seal mounted on a bottom edge of the fire door; and end caps installed on two narrow side ends of the fire door. The system has been UL certified for 90 minutes fire doors. The system may further comprise means for securely fastening at least the door sweep, door shoe and end caps to the fire door. The door sweep may include a solid neoprene rubber seal fitted with a retaining plate. The intumescent seal may be self-adhesive and made of TECNOFIRE® 2000. Each of the end cap may cover an opening between the bottom edge of the fire door and a floor surface on either narrow side end of the fire door.

In yet another aspect, the present disclosure discloses a method for rectifying excessive bottom clearances of door assemblies. The method may comprise: providing a door sweep on a first side of a fire door; mounting a door shoe on a second opposite side of the fire door; providing an intumescent seal in an opening between a bottom edge of the fire door and a floor surface; and mounting end caps on two narrow ends of the fire door. The method may further comprise securely fastening at least the door sweep, door shoe, and end caps to the fire door. The door sweep may comprise a solid neoprene rubber seal fitted with a retaining plate. The intumescent seal may be self-adhesive and made of TECNOFIRE® 2000. The door shoe may comprise an L-shaped door shoe having a vertical portion and a horizontal portion to wrap around the bottom edge of the fire door with an opening between the bottom edge of the fire door and a top side of horizontal portion. The intumescent seal may be positioned on the top side of the horizontal portion of the door shoe. Each of the end caps covers an opening between the bottom edge of the fire door and the horizontal portion of the door shoe on either narrow side end of the fire door.

The present disclosure discloses another method for rectifying excessive bottom clearances of door assemblies. The method may comprise: providing a door sweep on either side of a fire door; mounting an intumescent seal on a bottom edge of the fire door; and mounting end caps on two narrow ends of the fire door. The method may further comprise securely fastening at least the door sweep, door shoe and end caps to the fire door. The door sweep may comprise a solid neoprene rubber seal fitted with a retaining plate. The intumescent seal may be self-adhesive and made of TECNOFIRE® 2000. Each of the end cap may cover an opening between the bottom edge of the fire door and a floor surface on either narrow side end of the fire door.

In accordance with an important aspect, the present disclosure also provides a system for rectifying excessive head clearances of door assemblies. The system may comprise a door cap straight component installed on a first side of a fire door; a door cap L-shaped component installed on a second opposite side of the fire door; at least one intumescent strip seal fitted with the door cap L-shaped component; and end caps installed on two narrow ends of the fire door. The system has been UL certified for up to 90 minutes for fire doors with head clearances over ⅛" and up to ½". The door cap straight component, the door cap L-shaped component, and the end caps may be made of stainless steel or steel. The system may further comprise means for securely fastening at least the door cap straight component, the door cap L-shaped component, and the end caps to the fire door. The intumescent strip seal may be self-adhesive and made of TECNOFIRE® 2000. The door cap L-shaped component may comprise a vertical portion for mounting onto an outer surface of the second side of the fire door and a horizontal portion inserted into a gap between a top edge of the fire door and a door frame above the fire door. The intumescent strip seal may be positioned on a top side of the horizontal portion. In one embodiment, the intumescent strip seal may comprise a first intumescent strip seal positioned on a top side of the horizontal portion, and a second intumescent strip seal positioned on a bottom side of the horizontal portion.

Furthermore, the present disclosure provides a method for rectifying excessive head clearances of door assemblies. The method may comprise: mounting a door cap straight component on a first side of a fire door; mounting a door cap L-shaped component on a second opposite side of the fire door; fitting at least one intumescent strip seal with the door cap L-shaped component; and mounting end caps on two narrow ends of the fire door. The method may further comprise securely fastening at least the door cap straight component, the door cap L-shaped component, and the end caps to the fire door. The door cap straight component, the door cap L-shaped component, and the end caps may be made of stainless steel or steel. The intumescent strip seal may be self-adhesive and made of TECNOFIRE® 2000. The door cap L-shaped component may comprise a vertical portion for mounting onto an outer surface of the second side of the fire door and a horizontal portion inserted into a gap between a top edge of the fire door and a door frame above the fire door. The intumescent strip seal may be positioned on a top side of the horizontal portion. In another embodiment, the intumescent strip seal may comprise a first intumescent strip seal positioned on a top side of the horizontal portion, and a second intumescent strip seal positioned on a bottom side of the horizontal portion.

Additionally, the present disclosure provides a system for rectifying excessive head clearances of door assemblies. The system may comprise a door cap straight component installed on a first side of a fire door; a door cap L-shaped component installed on a second opposite side of the fire door; and end caps installed on two narrow ends of the fire door. The system has been UL certified for up to 90 minutes for fire doors with head clearances over ⅛" and up to ½". The system may further comprise means for securely fastening at least the door cap straight component, the door cap L-shaped component, and the end caps to the fire door. The door cap straight component, the door cap L-shaped component, and the end caps may be made of stainless steel or steel. The door cap L-shaped component may comprise a vertical portion for mounting onto an outer surface of the second side of the fire door and a horizontal portion inserted into a gap between a top edge of the fire door and a door frame above the fire door.

The present disclosure also provides a method for rectifying excessive head clearances of door assemblies. The method may comprise: mounting a door cap straight component on a first side of a fire door; mounting a door cap L-shaped component on a second opposite side of the fire door; and mounting end caps on two narrow ends of the fire door. The method may further comprise securely fastening at least the door cap straight component, the door cap L-shaped component, and the end caps to the fire door. The door cap straight component, the door cap L-shaped component, and the end caps may be made of stainless steel or steel. The door cap L-shaped component may comprise a vertical portion for mounting onto an outer surface of the second side of the fire door and a horizontal portion inserted into a gap between a top edge of the fire door and a door frame above the fire door.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1B:
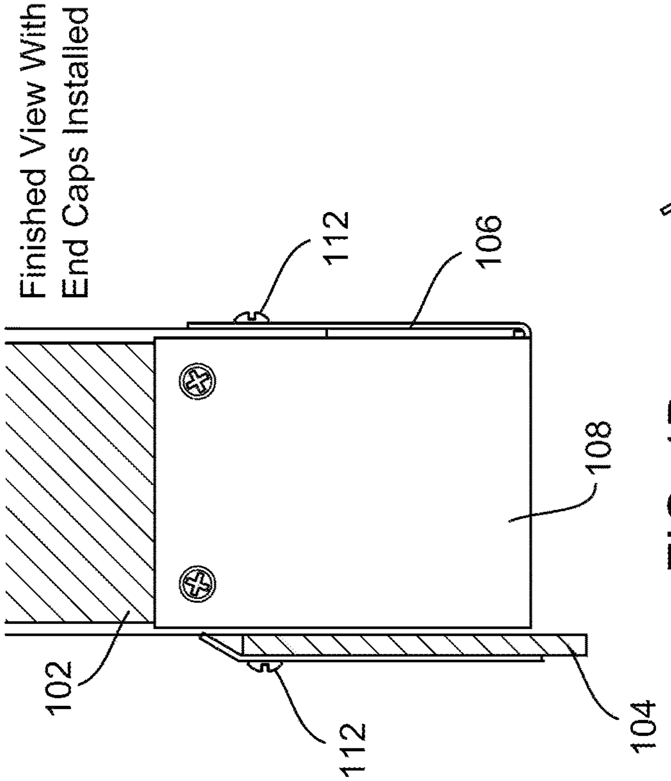
FIGS. 1A, 1B and 1C illustrate different views of a first embodiment of a UL certified intumescent door bottom system for fire doors with excessive door bottom clearances up to 1½", according to an exemplary aspect.
Figure 1C:
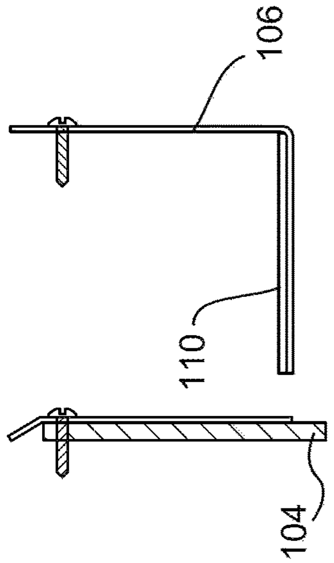

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below.

The present disclosure generally relates to solutions and systems for bringing fire doors that have excessive clearances (gaps) into compliance with various regulatory codes and standards. For example, perimeter gaps in doors may refer to the distance between the side edge of a door and door frame as measured on a pull side of the opening. Door bottom clearances or door bottom gaps may refer to the distance between the bottom of the door and the floor or a door threshold (a structure (e.g., a strip or wood or metal) that runs across the bottom of a door frame). Door head clearances or door head gaps may refer to the distance between the top edge of the door and an adjacent structure (e.g., a door frame edge immediately above the door). Proper gap tolerances may ensure that a fire door will perform as it is intended. Gaps or clearances that are outside of tolerance may lead to compromised fire door integrity in hazardous situations as well as not allowing the fire door latching mechanism to engage fully as it is required to do so by relevant codes or regulations. National fire protection association (NFPA), one code standard for fire doors, requires that fire doors must be inspected on an annual basis. For example, maximum allowable perimeter gap is ⅛" for wood doors, ⅛"+/−1⁄16" for metal doors. Maximum allowable door bottom gap is ¾". Gaps that exceed these maximum allowable tolerances may result in a non-compliant fire door that needs to be repaired or replaced entirely.

Standard test methods for fire door assemblies, such as UL 10C, UL 10B, NFPA 80 or NFPA 252, measure the ability of door assemblies of various materials and types of construction for use in wall openings during a fire to retard the passage of the fire and evaluate the fire-resistant properties of these door assemblies. These tests may expose a specimen (e.g., a test door assembly) to a standard fire exposure controlled to achieve specified temperatures throughout a specified time period, followed by the application of a specified standard fire hose stream. The exposure, however, is not representative of all fire conditions, which vary with changes in the amount, nature, and distribution of fire loading, ventilation, compartment size and configuration, and heat sink characteristics of the compartment. It does, however, provide a relative measure of fire performance of door assemblies under these specified fire exposure conditions. In conducting such tests, for example, a door may be mounted in an opening of a fire proof wall, and one side of the door is exposed to a predetermined range of temperatures over a predetermined period of time, followed by the application of a high-pressure hose stream that causes the door to erode and provides a thermal shock to the assembly. Doors are given a fire rating based on the duration of the heat exposure of 20 minutes, 30 minutes, 45 minutes, one hour (60 minutes), 1½ hours (90 minutes) or three hours (180 minutes). The door assembly may receive the fire rating when it remains in the wall opening for the duration of the fire test and hose stream, within certain limitations of movement and without developing openings through the door either at the core or around the edge material.

According to aspects of the present disclosure, a UL certified solution or intumescent door bottom system for fire doors with excessive door bottom clearances up to 1½" may comprise a door sweep on a first side of a door assembly, a door shoe with an intumescent strip seal on a second opposite side of the door assembly, end caps to cover both side ends of the door assembly, and means for securely fastening or fixing the door sweep, door shoe, end caps and other components to the door assembly. The disclosed system may be installed at the bottom of a fire door to rectify excessive door bottom gaps and create a barrier against, e.g., sound, light, fire, smoke and air infiltration in hazardous situations. The disclosed system may also be configured to prevent water seepage, dust and moisture from coming through the gap under the fire door.

Referring to FIGS. 1A-1C and 2A-2D, in one embodiment of the present disclosure, system 100 may comprise a brushed stainless steel or steel retaining plate with a neoprene rubber sweep 104 on e.g., a pull side of a fire door 102 that may be a wood or metal fire door, a brushed stainless steel or steel door shoe 106 with an intumescent strip seal 110 on e.g., a push side of the fire door 102, brushed stainless steel or steel end caps 108 on both narrow side ends of the fire door 102, and a number of sheet metal screws 112 or any other suitable means for fastening all of the above-mentioned component pieces to the bottom of fire door 102. For purposes of explanation, a door assembly generally has a push side and a pull side. A push side may refer to the side where the door swings away from a user and the user may push the door to open, and the pull side refers to the side where the door swings toward the user and the user may pull the door to open. It should be appreciated that the installation of door sweep 104 and door shoe 106 on pull and/or push sides of fire door 102 may depend upon e.g., specific configuration and dimension of fire door 102. Further, other materials may be used in place of neoprene rubber as a sweep material. Some commonly used sweep materials may include but not limited to: silicone rubber, ethylene propylene diene monomer (EPDM) rubber, vinyl and other thermoplastics, nylon Brush, and polyurethane. System 100 may be used on up to 90 minutes UL 10B and UL 10C wood or hollow metal fire doors with bottom clearance exceeding ¾" up to ½". System 100 is UL certified for 90 minutes fire doors with bottom clearance up to 1½".

Pull side door sweep 104 may have different lengths, such as 36" and 48" as illustrated in FIGS. 3A-3C and 4A-4C, respectively, to accommodate fire doors having different widths. In one embodiment, pull side door sweep 104 may comprise a solid neoprene rubber seal (e.g., ⅛" in thickness) fitted with (e.g., via adhesive tapes, glue or any suitable adhesion means) a stainless steel or steel retaining plate having an angled edge (e.g., 150° between the edge and main body of the plate) and a wall thickness of 0.036". This angled edge of the retaining plate may help achieve a finished look of door sweep 104 on fire door 102 and prevent dust from accumulating on the neoprene rubber seal over time. A plurality of through holes may be provided along an upper edge of stainless steel or steel retaining plate (e.g., ⅜" to the upper edge) such that door sweep 104 may be securely fastened near the bottom side of door 102 on the pull side. Door sweep 104 helps protect the intumescent strip seal 110 during a fire which may expand to seal the space between the bottom edge of door 102 and door shoe 106.

Figure 1A:
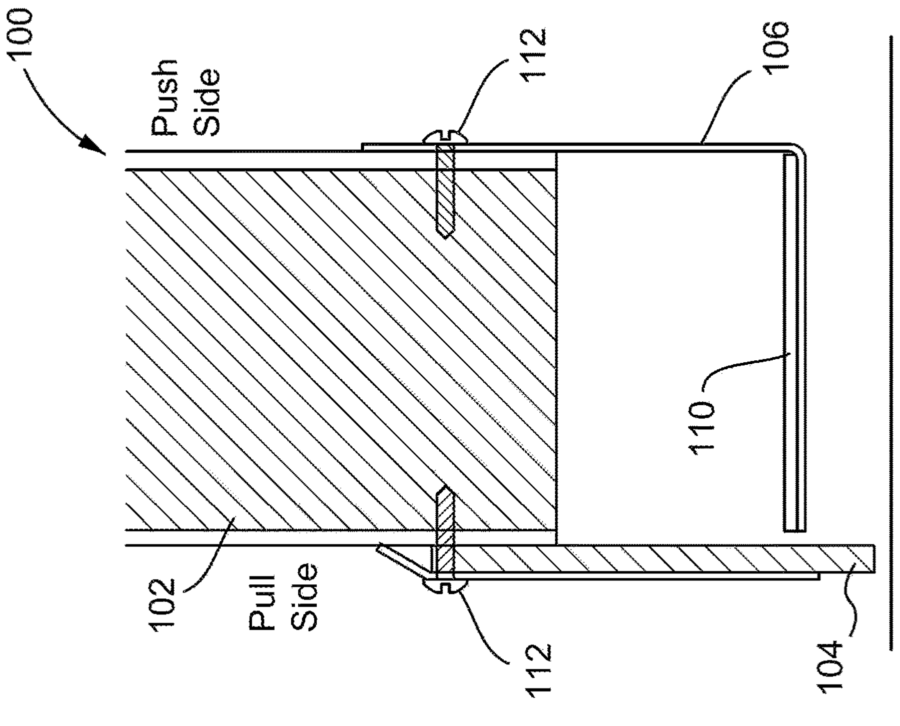
Figure 2B:
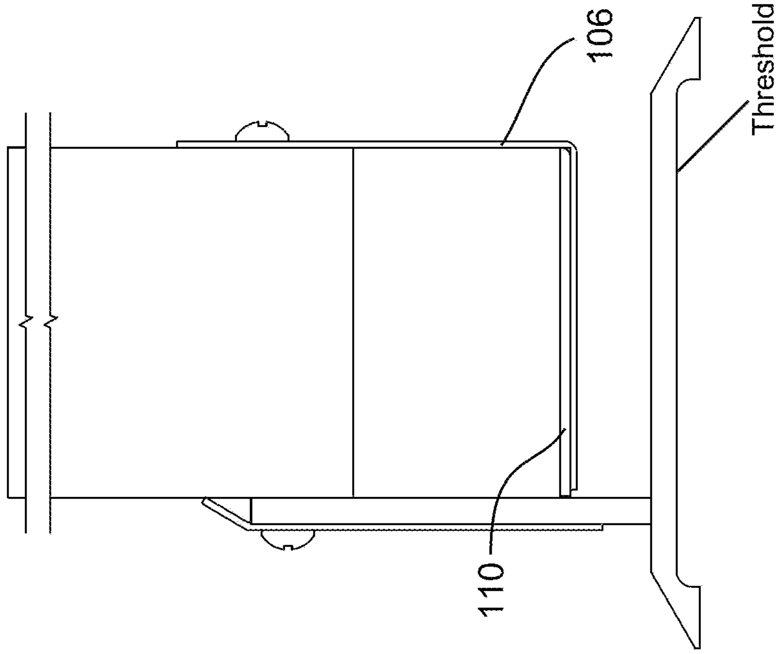
FIG. 2B shows a first end view of the first embodiment with end caps removed, according to an exemplary aspect.

Referring now to FIGS. 5A-5C and 6A-6C, push side door shoe may be a stainless steel or steel L-shaped door shoe 106 having a vertical portion 114 to fasten near the bottom of the door 102 and a horizontal portion 116 to wrap around the bottom edge of door 102 on the push side. In accordance with aspects of the present disclosure, as shown in FIGS. 1A, 1B and 2B, door shoe 106 may be so positioned on door 102, such that there is an opening between the bottom edge of door 102 and a top side of horizontal portion 116 under door 102. A bottom side of horizontal portion 116 may be positioned at most ¾" above the floor surface. It should be appreciated that the clearance between the horizontal portion 116 of door shoe 106 and floor surface or door threshold may be determined and selected in accordance with the allowable door bottom gap required by relevant fire door regulations and codes (e.g., at most ¾"). Door shoe 106 may have different lengths, such as 36" and 48" illustrated respectively in FIGS. 5A and 6A, to accommodate fire doors having different widths. In one embodiment, the vertical portion 114 may have a height of 2" and a wall thickness of 0.036". A plurality of through holes may be provided along an upper edge of vertical portion 114 (e.g., ⅜" to the upper edge), such that door shoe 106 may be securely fastened near the bottom side of door 102 and substantially flush with the outer surface of door 102 on the push side. The number, exact positioning, arrangement and spacing of these through holes may depend upon the dimension of the door 102 and desired mechanical strength and stability of door shoe 106. Horizontal portion 116, which may have a width of 1¾" and may be substantially perpendicular to the vertical portion 114, is configured to hold an intumescent strip seal 110 in place under door 102 during a fire. In one embodiment, intumescent strip seal 110 may be a 1.3 mm thick self-adhesive intumescent seal made of TECNOFIRE® 2000 or any suitable fire protection material mounted on the top side of horizontal portion 116 of door shoe 106. It should be appreciated that the specific thickness and/or width of the intumescent seal 110 may be selected in connection with characteristics of the intumescent materials used such as expansion ratio, char porosity and thermal conductivity coefficient. When exposed to high heat of a fire, the intumescent strip seal 110 may expand to fill the opening between the bottom edge of door 102 and the top side of horizontal portion 116, thereby insulating the bottom of the door 102 and protecting it from deteriorating and failing during the fire. The width of horizontal portion 116 may depend on the width of the intumescent strip seal 110 and door 102. Preferably, the horizontal portion 116 is wide enough to hold the intumescent strip seal 110 and span most of the bottom edge of door 102.

Figure 7A:
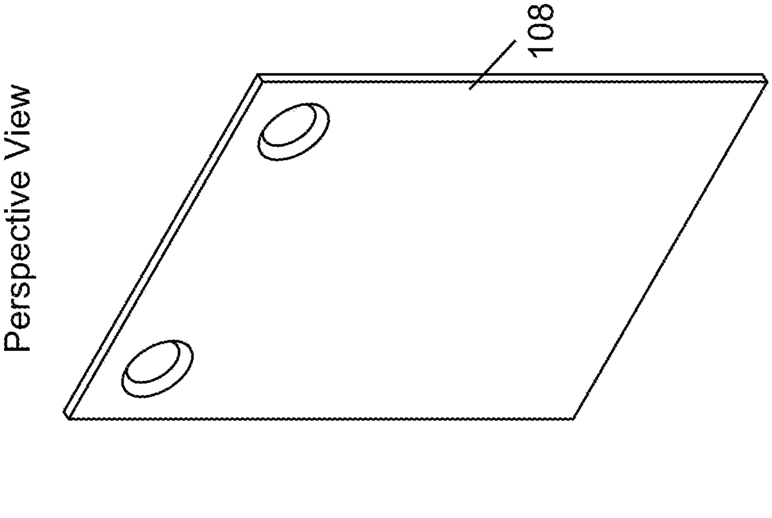
FIGS. 7A, 7B and 7C illustrate different views of an example stainless steel end cap of the first embodiment, according to an exemplary aspect.
Figure 7B:
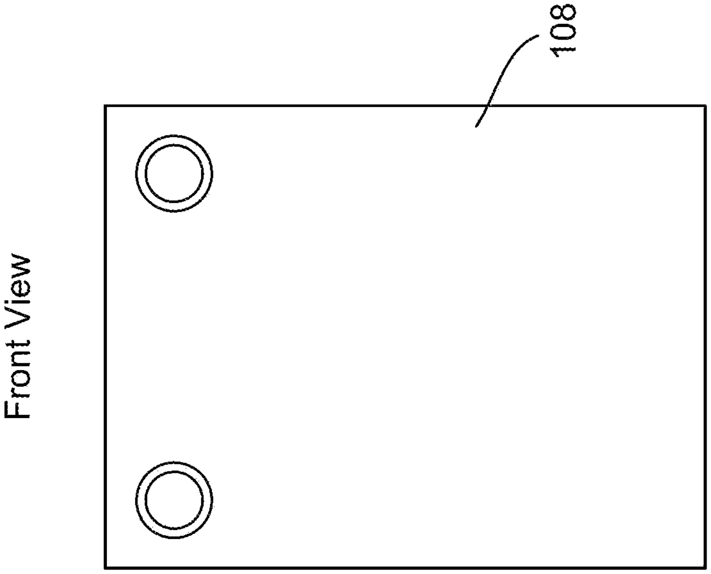
Figure 7C:
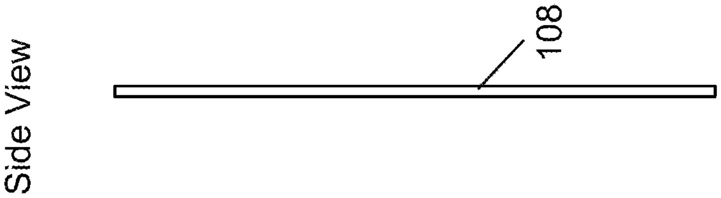

Furthermore, as shown in FIGS. 1B, 2A, 2C, 2D and 7A-7C, stainless steel or steel end caps 108 may be installed on both side ends of door 102 via screws 112 or any other suitable means. End caps 108 may substantially cover the opening under the bottom edge of door 102 down to the top side of horizontal portion 116 of door shoe 106, thereby containing the intumescent strip 110 during a fire and allowing it to stay under the door 102. End caps 108 may have a width slightly narrower than that of the door thickness, such that they do not extend beyond the edges of door 102 and are easy to install. In one embodiment, as illustrated in FIG. 7A and FIG. 7B, stainless steel end caps 108 may be rectangular in shape and have a wall thickness of 0.036". It should be appreciated that the exact shape, dimensions, and positioning of end caps 108 may vary depending upon specific configuration and installation of door shoe 106 on door 102. For example, end caps 108 may be L-shaped wrapping around the narrow end of door 102 with a vertical portion flush with door surface and a horizontal portion under the door frame.

To install system 100 on a fire door assembly to rectify excessive door bottom clearances, one may first measure and determine the dimensions and location of L-shaped stainless steel door shoe 106 with an intumescent strip seal 110 in relation to the bottom edge of door 102 on the push side. Thereafter, one may close door 102 and hold door shoe 106 at the bottom of push side of door 102 with approximately ⅜" (at most ¾") clearance above sill or floor surface. It should be appreciated that the clearance between the horizontal portion 116 of door shoe 106 and floor surface may be determined and selected in accordance with the allowable door bottom gap required by relevant fire door regulations and codes (e.g., at most ¾"). Via the plurality of through holes provided near the upper edge of vertical portion 114 as illustrated in FIGS. 5A, 5C, 6A and 6C, one may mark screw holes on the bottom push side of door 102 and then drill pilot holes for screws using e.g., a 7/64" drill bit. Subsequently, door shoe 106 may be installed on the bottom of push side of door 102 with screws or other fastening means and its position may be further adjusted to e.g., ⅜" (at most ¾") clearance above sill/threshold or floor.

Figure 2A:
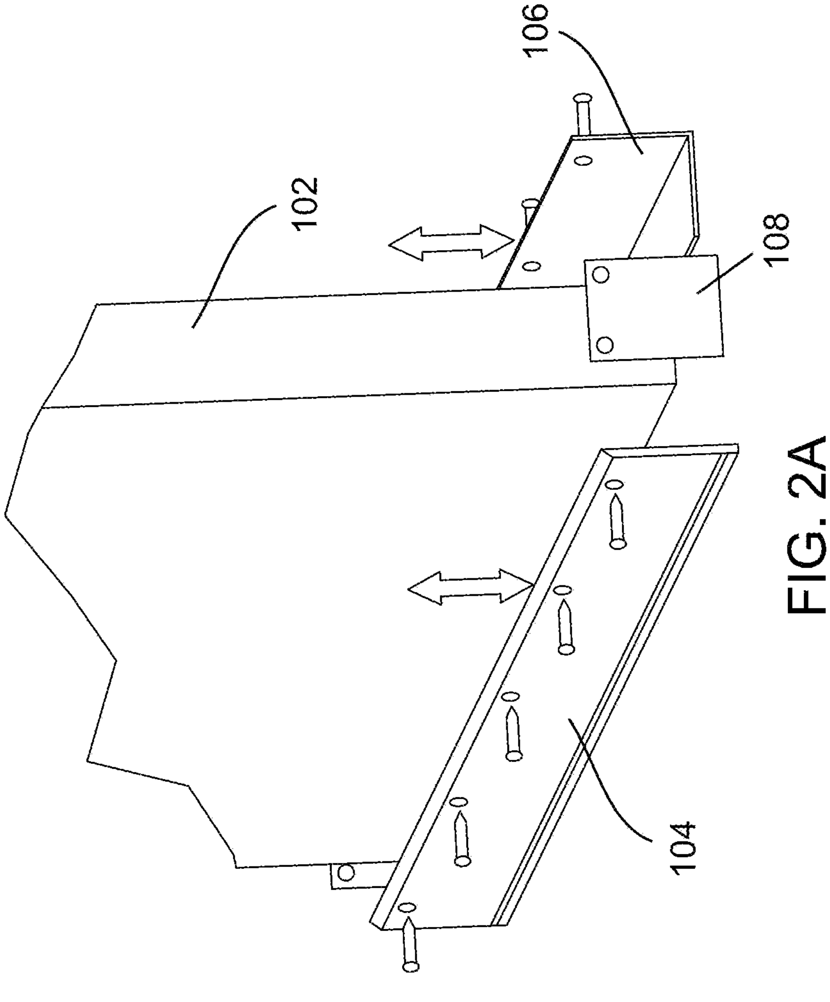
FIG. 2A shows an exploded view of the first embodiment, according to an exemplary aspect.
Figure 2D:
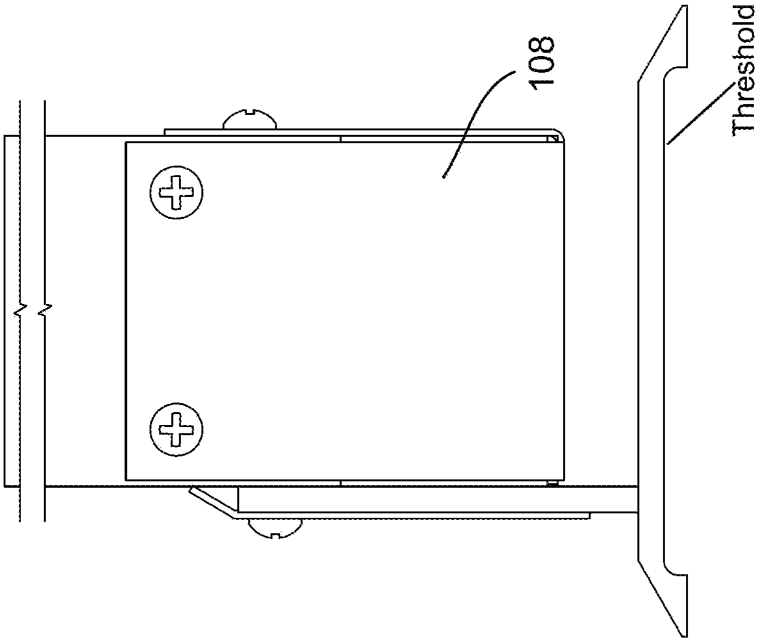
FIG. 2D shows a second end view of the first embodiment, according to an exemplary aspect.
Figure 2C:
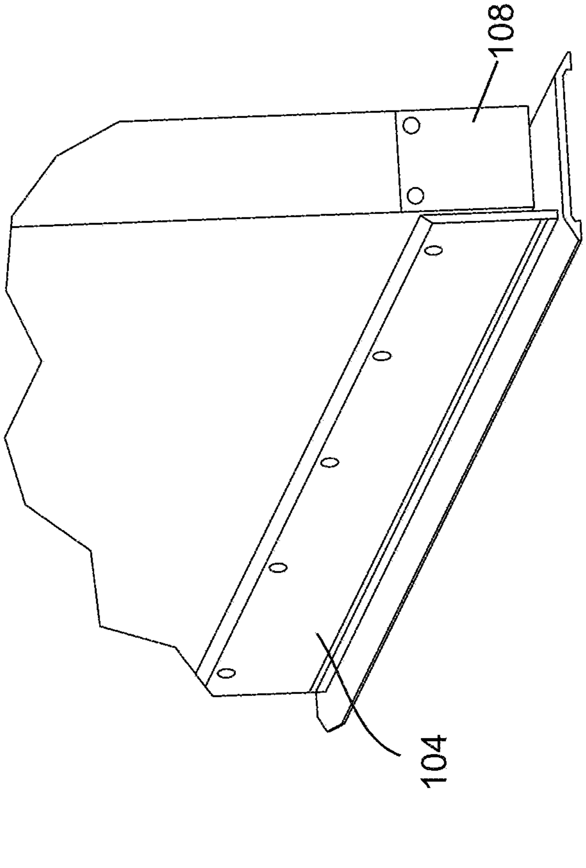
FIG. 2C shows an assembled view of the first embodiment, according to an exemplary aspect.
Figure 3B:
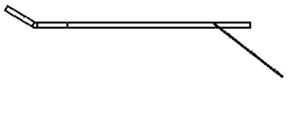
FIGS. 3A, 3B and 3C illustrate different views of a first example door sweep of the first embodiment, according to an exemplary aspect.
Figure 3C:
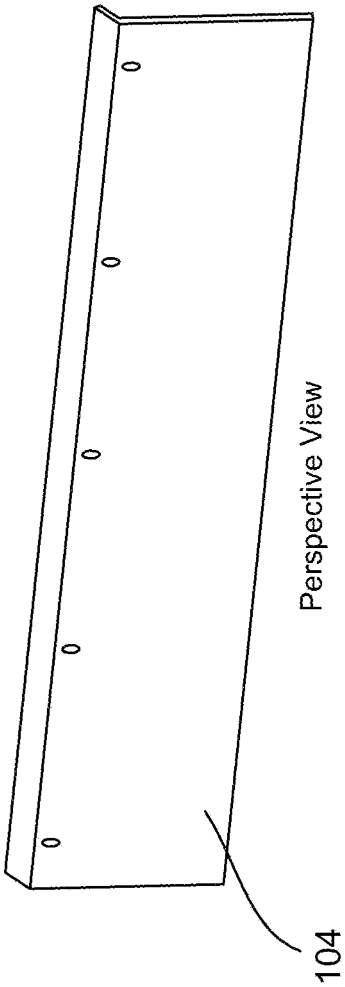
Figure 3A:
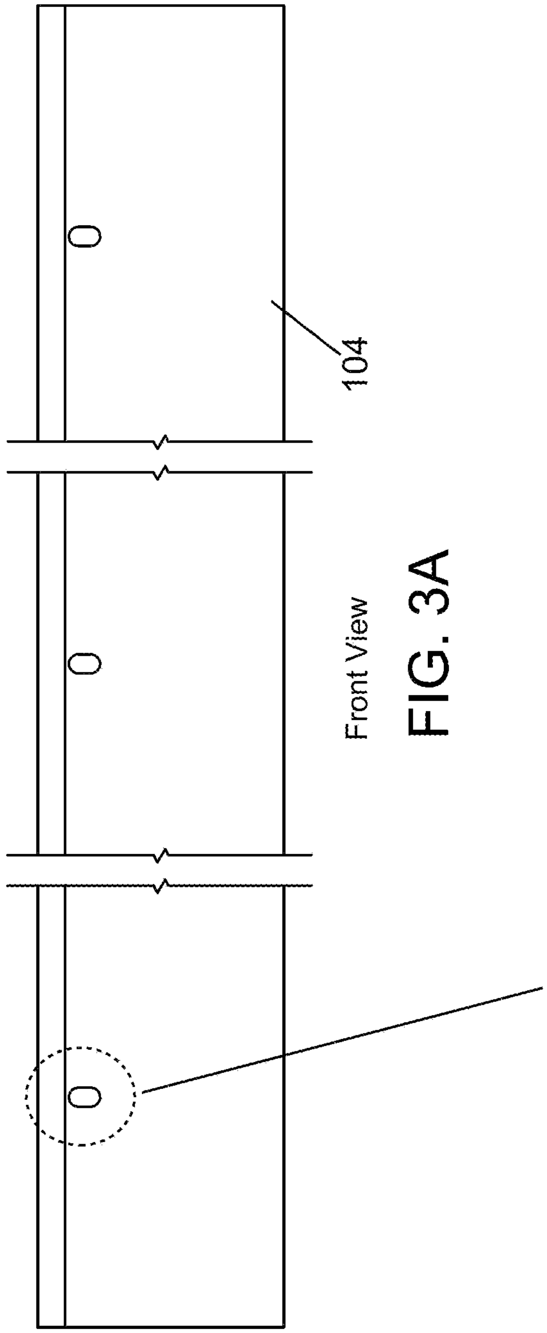
Figure 3A:
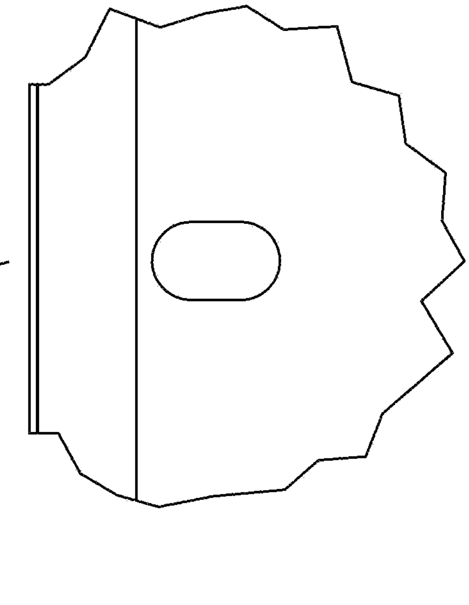
Figures 4A, 4B, 4C:
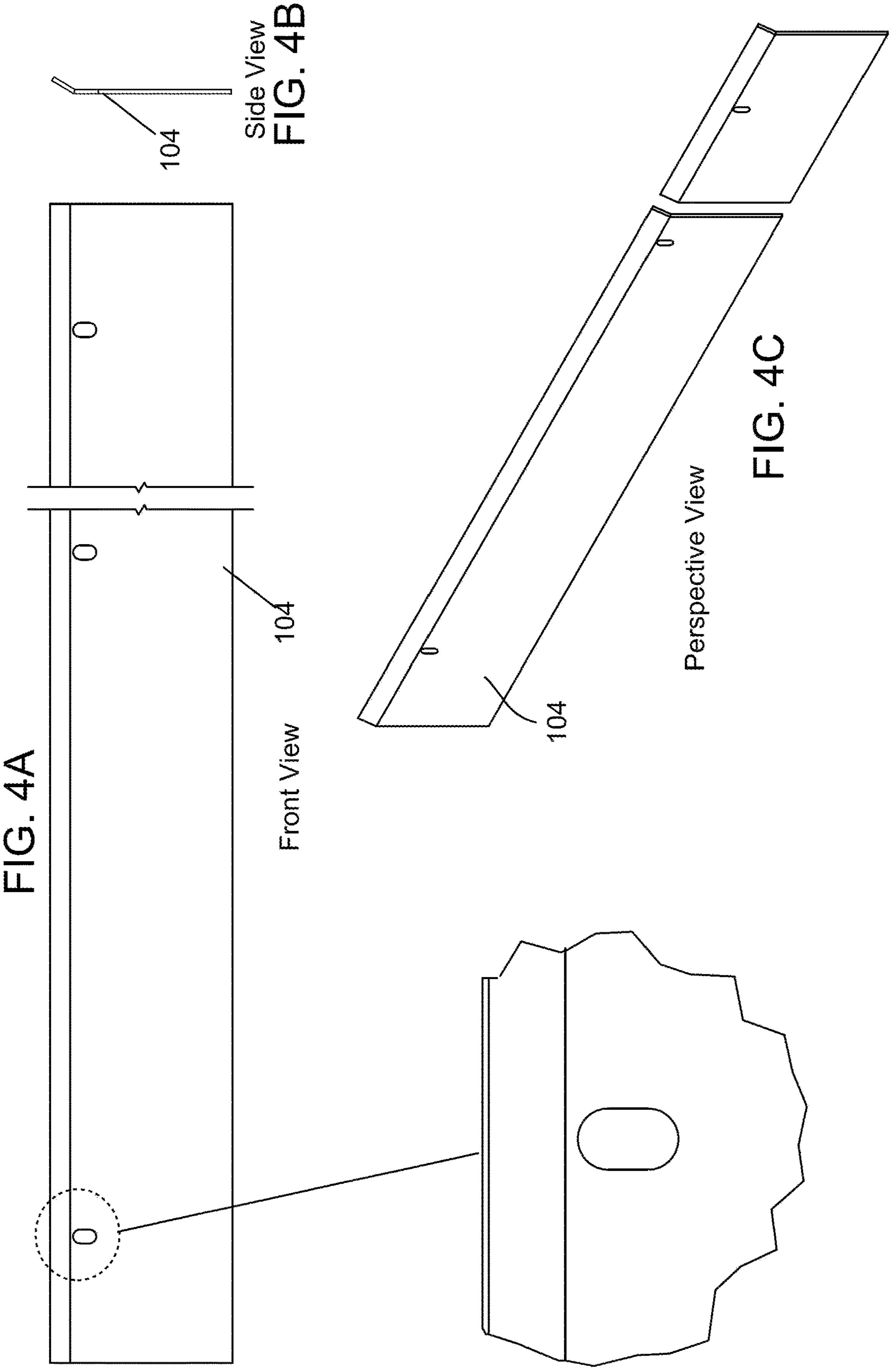
FIGS. 4A, 4B and 4C illustrate different views of a second example door sweep of the first embodiment, according to an exemplary aspect.
Figures 5A, 5B, 5C:
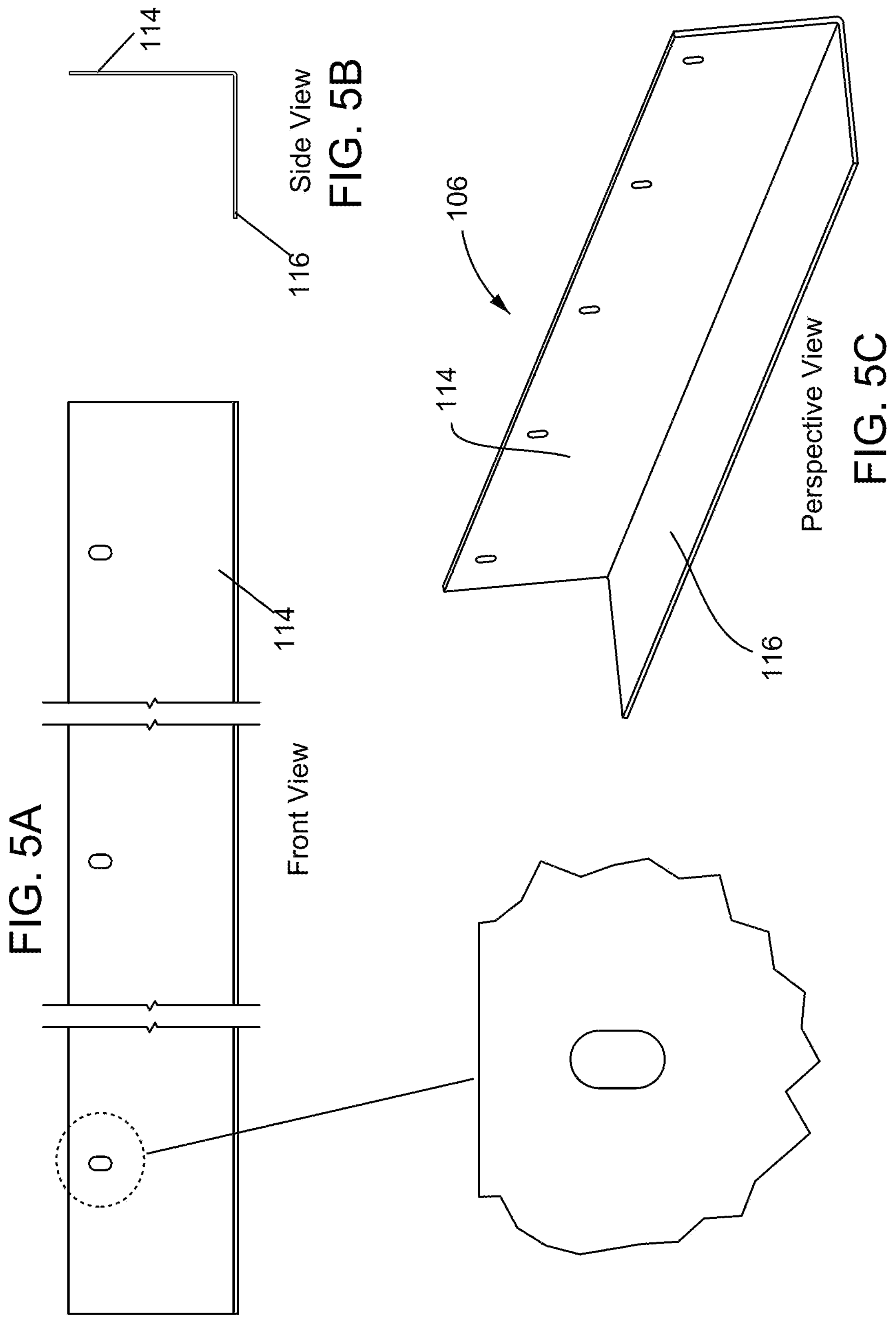
FIGS. 5A, 5B and 5C illustrate different views of a first example L-shaped door bottom shoe of the first embodiment, according to an exemplary aspect.
Figure 6B:
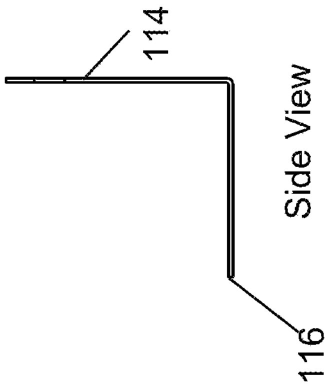
FIGS. 6A, 6B and 6C illustrate different views of a second example L-shaped door bottom shoe of the first embodiment, according to an exemplary aspect.
Figure 6C:
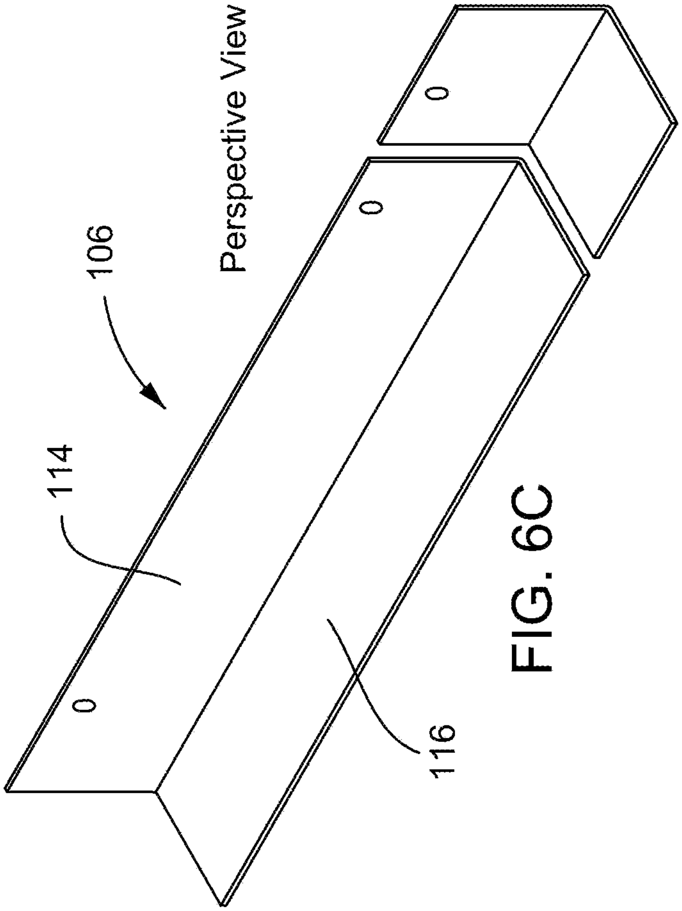
Figure 6A:
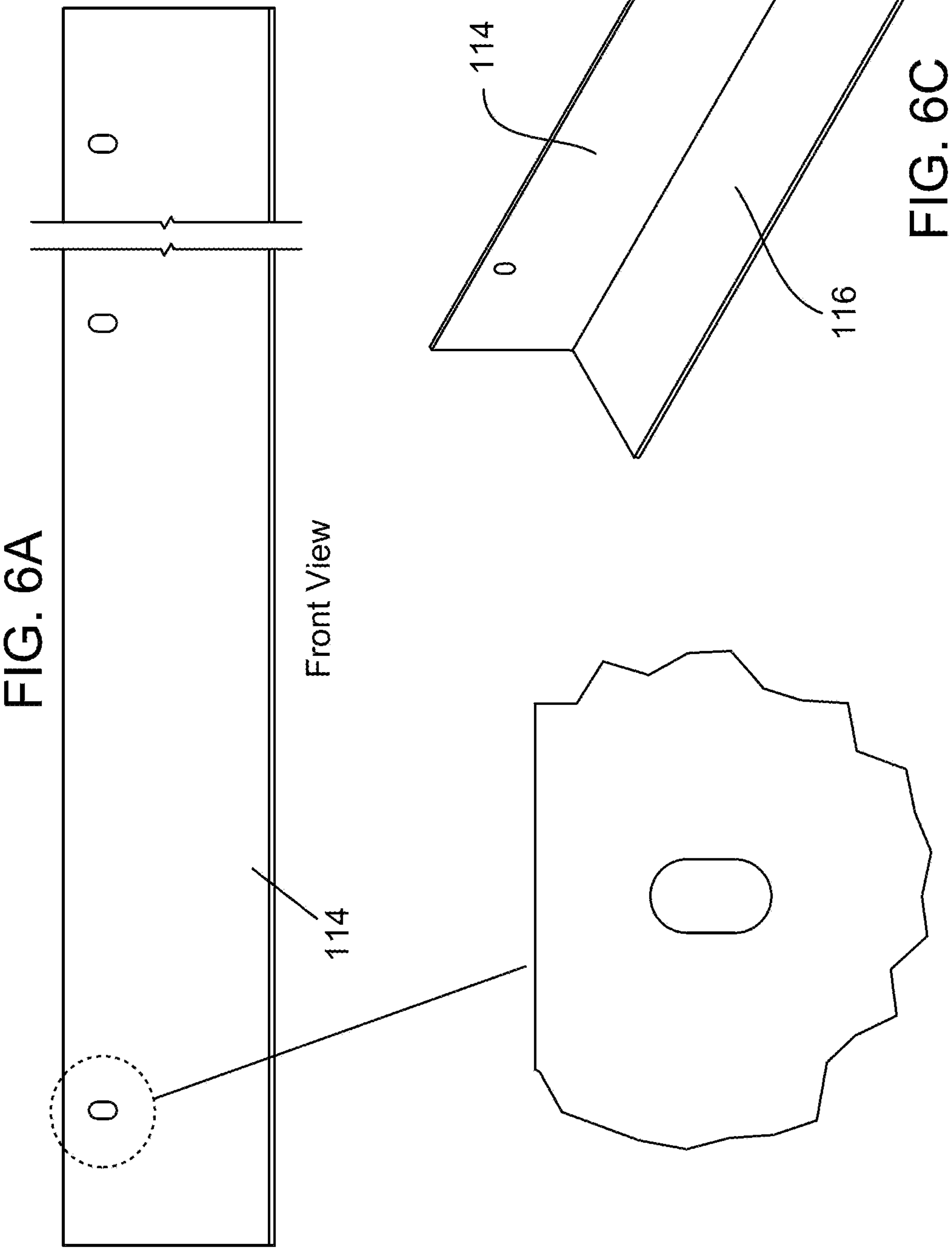

Next, to install door sweep 104 on the pull side of door 102, one may also first measure and determine the dimension and location of door sweep 104 in relation to the bottom edge of door 102. For example, the stainless steel or steel retaining plate may be 2" in height with its bottom edge ¼" higher than that of the neoprene rubber seal. Subsequently, one may close door 102, hold door sweep 104 at a selected position near the bottom of door 102, and tap down until contact is made between door sweep 104 and threshold. Via a plurality of through holes provided near the upper edge of stainless steel retaining plate as illustrated in FIG. 2A, one may mark screw holes on the bottom of the pull side of door 102 and then drill pilot holes for screws using e.g., a 7/64" drill bit. Subsequently, door sweep 104 may be installed on the bottom of pull side of door 102 with screws provided, and its position may be further adjusted so as not to impede proper closing and latching of door 102. Thereafter, as shown in FIGS. 2A, 2C and 2D, end caps 108 may be installed on both narrow side ends of door 102. One skilled in the art should appreciate that various means may be used for securely fastening the door sweep, door shoe, end caps and other components to fire door 102.

In another embodiment of the present disclosure, referring to FIGS. 8A-8C and 9A-9C, system 200 may comprise a brushed stainless steel or steel retaining plate with a neoprene rubber sweep 204 on each side of a fire door 202 that may be a wood or metal fire door, an intumescent strip seal 206 mounted directly on the bottom edge of door 202, brushed stainless steel or steel end caps 208 on both narrow side ends of the door 202, and a number of sheet metal screws 210 or any other suitable means for fastening all of the above-mentioned component pieces to the bottom of door 202. System 200 may be used on up to 90 minutes UL 10B and UL 10C wood or hollow metal fire doors with bottom clearance exceeding ¾" up to 1½".

As shown in FIGS. 8A, 8C and 9A-9C, each door sweep 204 may comprise a solid neoprene rubber seal (e.g., ⅛" in thickness) fitted with a stainless steel or steel retaining plate having an angled edge (e.g., 150° between the edge and main body of the plate) and a wall thickness of 0.036". This angled edge of the retaining plate may help achieve a finished look of door sweep 104 on fire door 102 and prevent dust from accumulating on the neoprene rubber seal. Door sweep 204 may be configured to help contain the intumescent strip seal 206 during a fire which expands to seal the door 202 to the floor, thereby providing a barrier against, e.g., sound, light, fire, smoke and air infiltration in hazardous situations. Door sweep 204 may also be configured to prevent water seepage, dust and moisture from coming through the gap under the fire door from both sides. Intumescent strip seal 206 may be a 2.6 mm thick self-adhesive intumescent seal made of TECNOFIRE® 2000 or any suitable fire protection materials mounted on the bottom edge of door 202. It should be appreciated that the specific thickness and/or width of the intumescent seal may be selected in connection with characteristics of the intumescent materials used such as expansion ratio, char porosity and thermal conductivity coefficient. When exposed to high heat of a fire, the intumescent strip seal 206 may expand to fill the opening between the bottom edge of door 202 and floor surface, thereby insulating the bottom of the door 202 and protecting it from deteriorating and failing during the fire.

Furthermore, stainless steel or steel end caps 208 may be installed on both narrow side ends of door 202 via screws 210 or any other suitable means to substantially cover the opening under the bottom edge of door 202 down to the floor surface in order to contain the intumescent strip 206 during a fire and allow it to stay under the door 202.

To install system 200 on a fire door assembly to rectify excessive door bottom clearances, one may first clean the bottom edge of door 202 with e.g., clean wipe to remove dust, oil, grease and dirt. High gloss painted surfaces may require roughening with a scotch brite pad or sand paper so adhesive will bond properly. Thereafter, one may measure and determine the dimensions of intumescent strip seal 206 to fit the door width. After removing the protective backing, one may position intumescent strip seal 206 on the door bottom edge and adhere seal by pressing firmly (e.g., 15 lbs. of pressure required) along entire length of the door bottom edge.

Figure 8C:
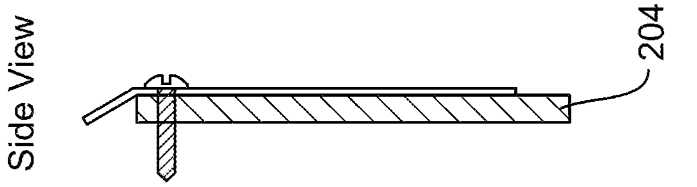
FIGS. 8A, 8B and 8C illustrate different views of a second embodiment of an UL certified intumescent door bottom system for fire doors with excessive door bottom clearances up to 1½", according to an exemplary aspect.
Figure 8B:
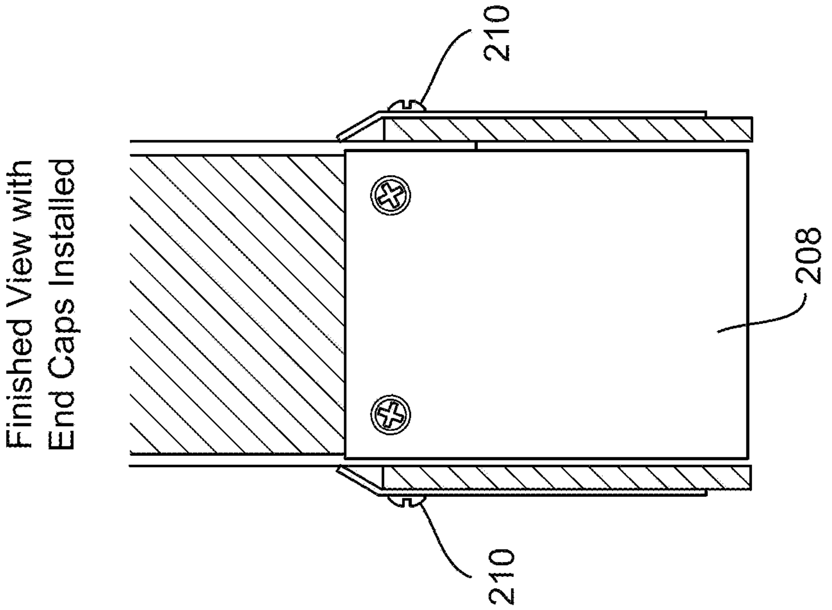
Figure 8A:
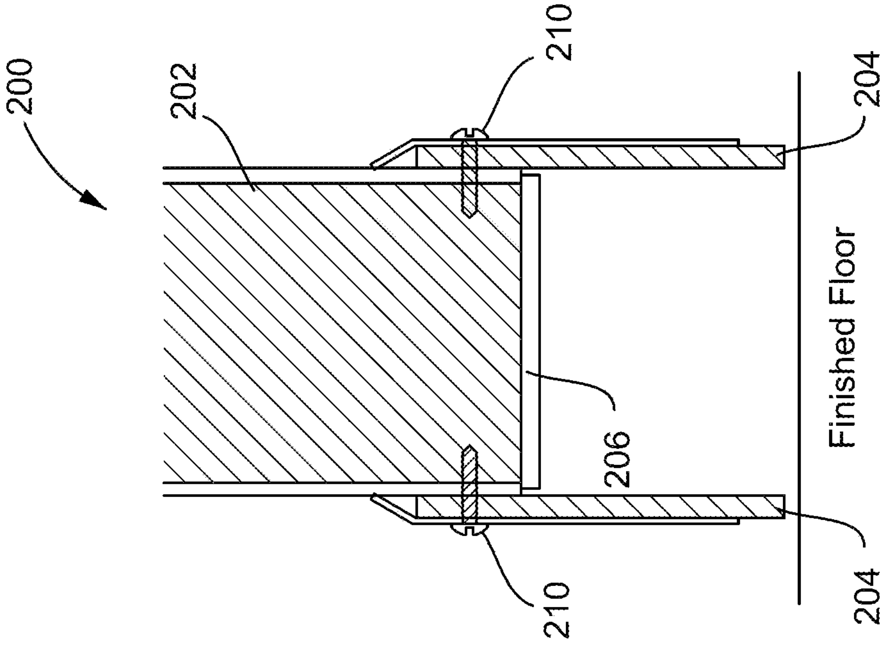
Figure 9B:
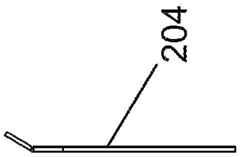
FIGS. 9A, 9B and 9C illustrate different views of an example door sweep of the second embodiment, according to an exemplary aspect.
Figure 9A:
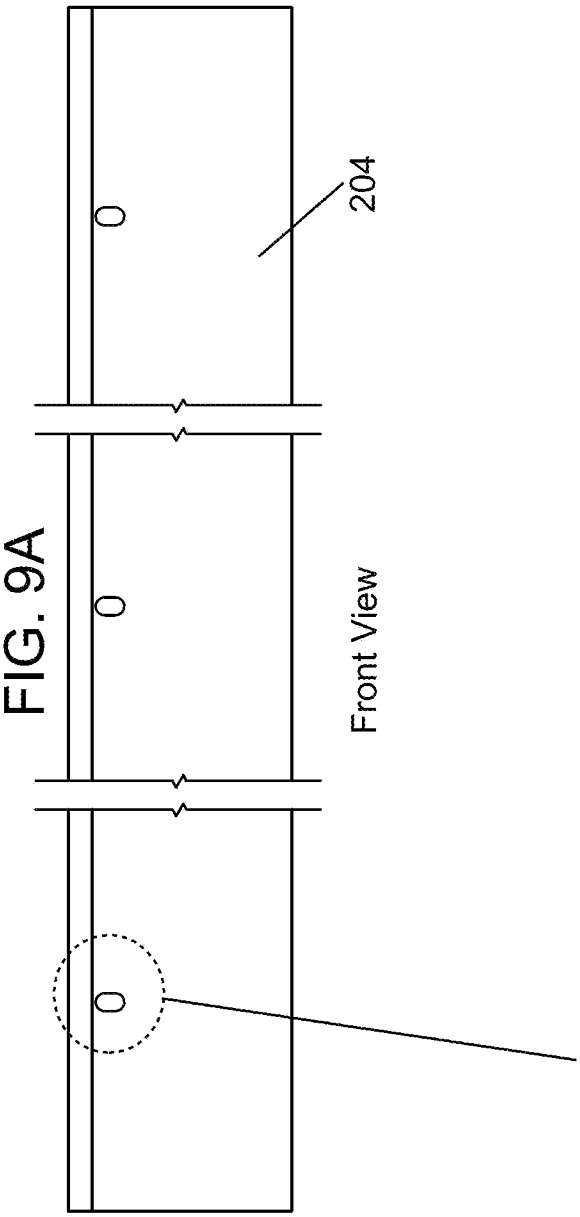
Figure 9C:
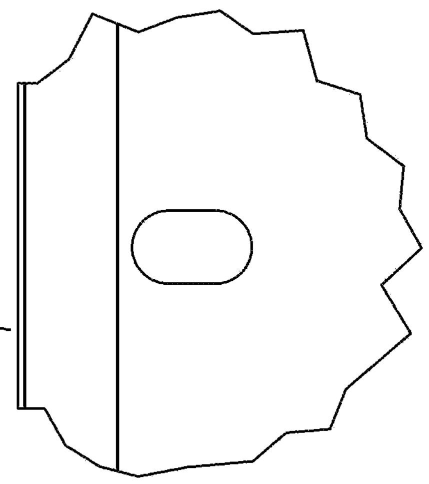
Figure 9C:
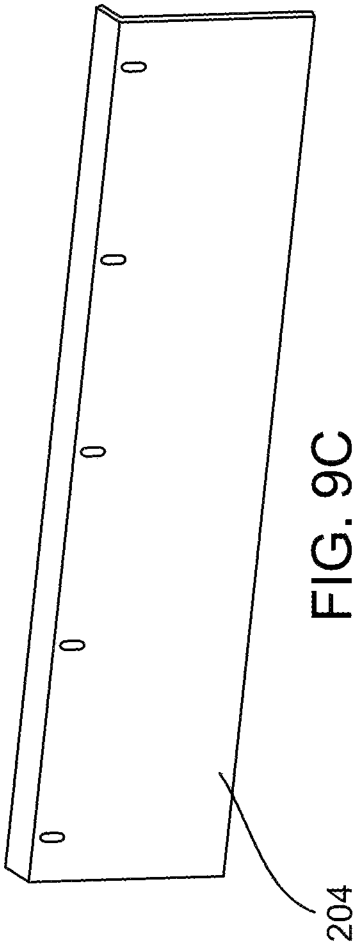

Next, to install door sweep 204 on each side of door 202, one may also first measure and determine the dimension and location of door sweep 104 in relation to the bottom edge of door 202. For example, the stainless steel retaining plate may be 2" in height with its bottom edge ¼" higher than that of the neoprene rubber seal. Subsequently, one may close door 202, hold door sweep 204 at a selected position near the bottom of door 202, and tap down until contact is made between door sweep 204 and threshold or floor. Via a plurality of through holes provided near the upper edge of stainless steel retaining plate as illustrated in FIG. 9C, one may mark screw holes on the bottom of door 202 and then drill pilot holes for screws using e.g., a 7/64" drill bit. Subsequently, door sweep 204 may be installed on the bottom of door 202 on both sides with screws provided, and its position may be further adjusted so as not to impede proper closing and latching of door 202. Thereafter, as shown in FIG. 8B, stainless steel or steel end caps 208 may be installed on both narrow side ends of door 202.

Moreover, the present disclosure discloses a door head solution or system for rectifying excessive door head clearances (e.g., over ⅛" up to ½") of a fire door. As will be described below, such a system may be installed at a head portion of the fire door to create a barrier against, e.g., sound, light, fire, smoke and air infiltration in hazardous situations and allow the fire door to pass a 90 minute positive pressure fire endurance and hose stream test.

Figure 10B:
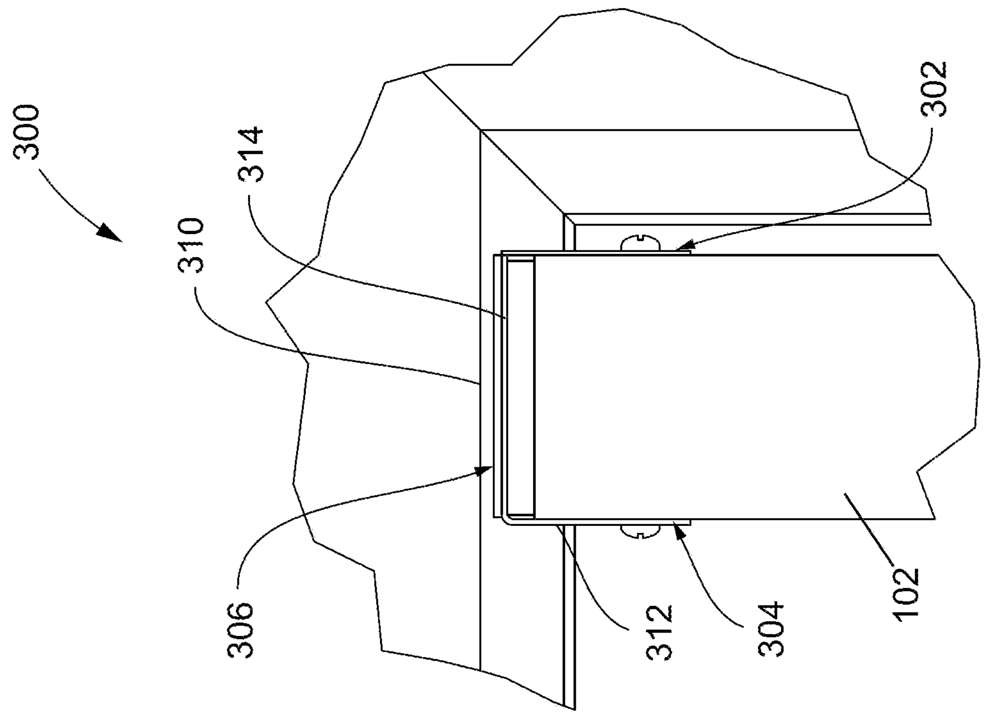
FIG. 10B illustrates a detailed view of a top corner of a fire door of the first embodiment, according to an exemplary aspect.
Figure 10A:
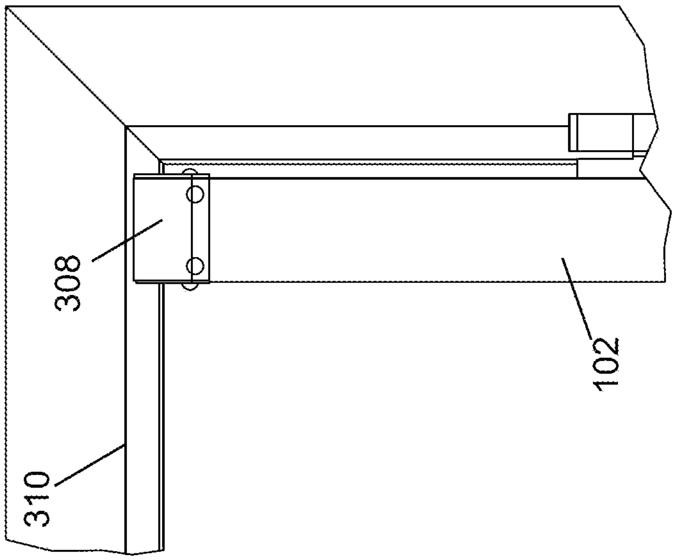
FIG. 10A illustrates a first embodiment of a door head system for fire doors with excessive door head clearances over ⅛", according to an exemplary aspect.
Figures 12A, 12B, 12C, 12D:
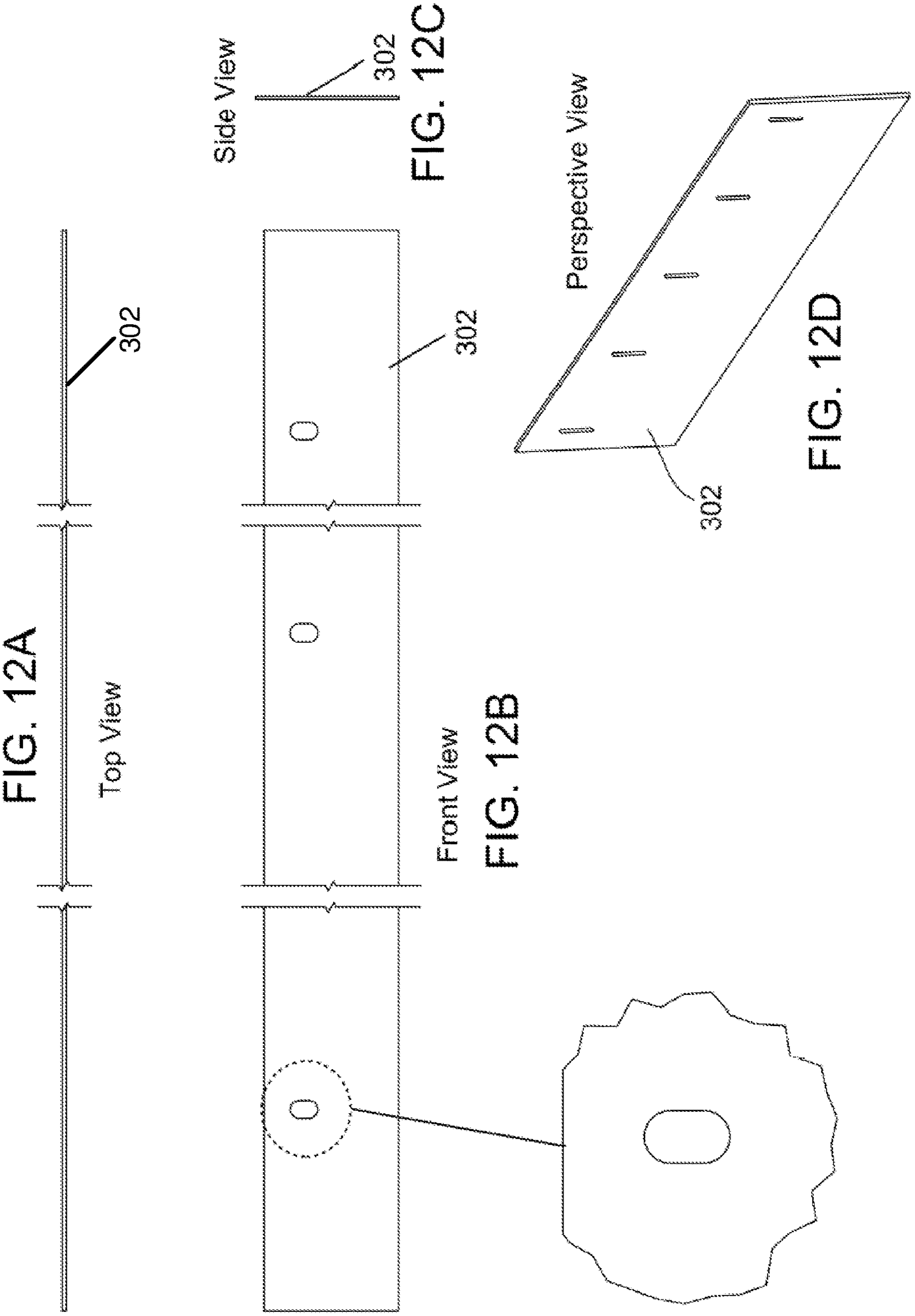
FIGS. 12A, 12B, 12C and 12D illustrate different views of an example door cap straight component of a door head system, according to an exemplary aspect.

FIGS. 10A and 10B illustrate a door head system 300 for fire doors with excessive door head clearances over ⅛" (maximum clearance of ⅛" is permitted by NFPA 80), according to aspects of the present disclosure. System 300 may comprise a brushed stainless steel or steel door cap straight component 302 (shown in FIGS. 12B-12D) mounted on a first side (e.g., pull side) of a fire door 102 that may be a wood or metal fire door, and a brushed stainless steel or steel door cap L-shaped component 304 (shown in FIGS. 13B-13D) mounted on a second side (e.g., push side) of fire door 102 and fitted with an intumescent seal 306. System 300 may additionally comprise end caps 308 mounted on both side ends of fire door 102 to protect the intumescent seal 306 and the integrity of the head portion of door 102 in hazardous situations. A number of sheet metal screws or any other suitable means may be additionally provided by system 300 for fastening all of the above-mentioned component pieces to the head portion of fire door 102. It should be appreciated that the installation of door cap straight component 302 and L-shaped component 304 on pull and/or push sides of fire door 102 may depend upon, amongst other things, specific configuration and dimension of fire door 102.

Door cap straight component 302 may have different widths (e.g., 1¼") and lengths (e.g., 36" and 48") to accommodate fire doors having different dimensions. In one embodiment, referring to FIGS. 12C and 12D, door cap straight component 302 may have a uniform thickness (e.g., 0.036") selected to allow it to be securely fastened onto the surface of door 102 on the pull side via a plurality of through holes without affecting the movement of door 102. The number, exact positioning, arrangement and spacing of these through holes may depend upon the dimension of door 102 and desired mechanical strength and stability of component 302. To rectify excessive door head clearance, at least a portion of component 302 may extend beyond the top edge of fire door 102 such that the top edge of component 302 and the door frame 310 immediately above door 102 have a gap of no more than ⅛" as permitted by NFPA 80 for wood and metal fire doors. Component 302 may also help maintain the intumescent seal 306 of the L-shaped component 306 in place and protect the head portion of fire door 102 during a fire.

Component 304 may be a stainless steel or steel L-shaped component wrapping around the push side surface and top edge of door 102 and having a vertical portion 312 for mounting to the outer surface of door 102 and a horizontal portion 314, which is substantially perpendicular to the vertical portion 312. In accordance with aspects of the present disclosure, as shown in FIGS. 10B, 11B, 13C and 13D, L-shaped component 304 may be selectively positioned on door 102, such that its vertical portion 312 is flush with the push side of door 102 and its horizontal portion 314 is inserted into the door head gap between the top edge of door 102 and the door frame 310 immediately above door 102. Horizontal portion 314, which is generally parallel to the top edge of door 102, may meet the straight component 302 at the pull side of door 102 at the same height, thereby forming a U-shaped structure covering the head portion of door 102. In the embodiment respectively shown in FIGS. 10A and 10B, the top side of horizontal portion 314 may be ⅛" below the door frame 310 in order to bring fire door 102 into compliance with relevant fire door regulations and codes (e.g., at most ⅛" as permitted by NFPA 80).

Figures 13A, 13B, 13C, 13D:
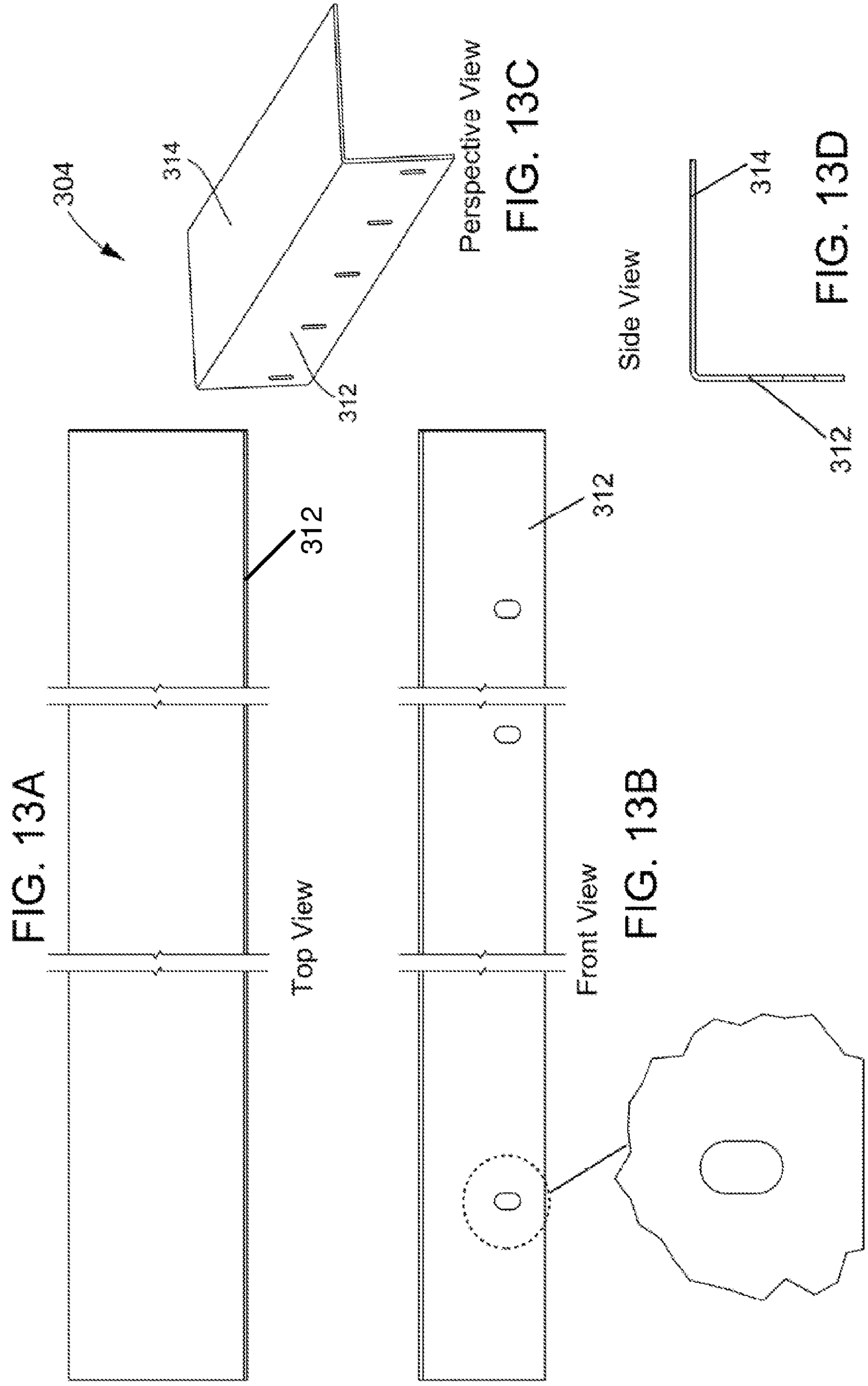
FIGS. 13A, 13B, 13C and 13D illustrate different views of an example door cap L-shaped component of a door head system, according to an exemplary aspect.

L-shaped component 304 may have different widths and lengths (e.g., 36" and 48") to accommodate fire doors having different widths. In one embodiment, as shown in FIGS. 13B and 13C, a plurality of through holes may be provided along a bottom edge of vertical portion 312 (e.g., ⅜" to the bottom edge), such that L-shaped component 304 may be securely fastened near the top portion of door 102 and substantially flush with the outer surface of door 102. The number, exact positioning, arrangement and spacing of these through holes may depend upon the dimension of the door 102 and desired mechanical strength and stability of component 304. Horizontal portion 314 may be configured to hold or fitted with intumescent strip seal 306 on its top side. Referring to FIG. 10B, the intumescent strip seal 306 may be a 0.65 mm thick self-adhesive intumescent seal made of TECNOFIRE® 2000 or any suitable fire protection material. When exposed to high heat of a fire, the intumescent strip seal 306 may expand to fill the opening between the top side of horizontal portion 314 and the door frame 310, thereby insulating the head portion of the door 102 and protecting it from deteriorating and failing during the fire. It should be appreciated that the specific thickness and/or width of the intumescent seal 306 may be selected in connection with characteristics of the intumescent materials used such as expansion ratio, char porosity and thermal conductivity coefficient. The width of horizontal portion 314 may depend on the width of the intumescent strip seal 306 and door 102. Preferably, the horizontal portion 314 is wide enough to hold the intumescent strip seal 306 and span most of the top edge of door 102.

Figure 14A:
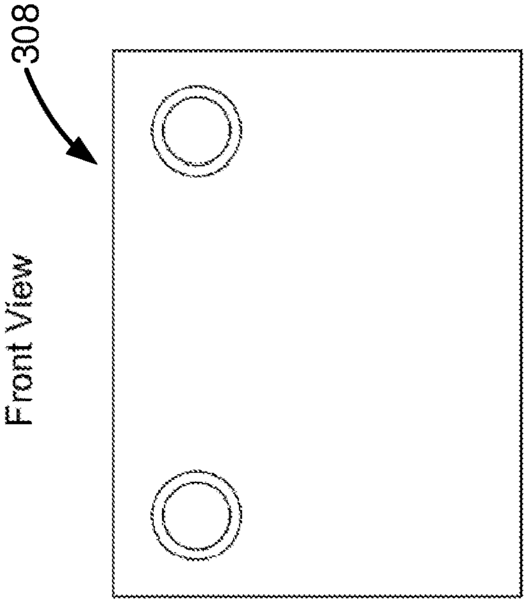
FIGS. 14A, 14B and 14C illustrate different views of an example door end cap of a door head system, according to an exemplary aspect.
Figure 14B:
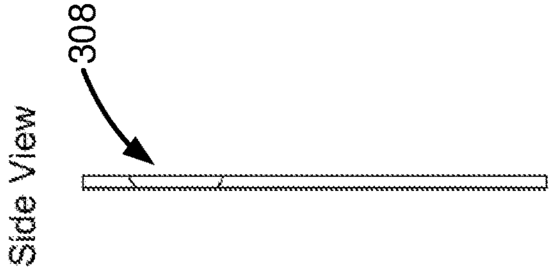

Furthermore, as shown in FIGS. 10A, 11A, and 14A-14C, stainless steel or steel end caps 308 may be installed on both side ends of door 102 via screws or any other suitable means. End caps 308 may substantially cover the opening between horizontal portion 314 and the top edge of door 102, thereby containing the intumescent strip 306 during a fire and allowing it to stay above the door 102. End caps 308 may have a width slightly narrower than that of the door thickness, such that they do not extend beyond the edges of door 102 and are easy to install. In one embodiment, as illustrated in FIGS. 14A and 14B, stainless steel end caps 308 may be rectangular in shape and have a wall thickness of 0.036". It should be appreciated that the exact shape, dimensions, and positioning of end caps 308 may vary depending upon specific configuration and installation of components 302 and 304 on door 102. For example, end caps 308 may be L-shaped wrapping around the narrow end of door 102 with a vertical portion flush with door surface and a horizontal portion under the door frame.

Figure 11B:
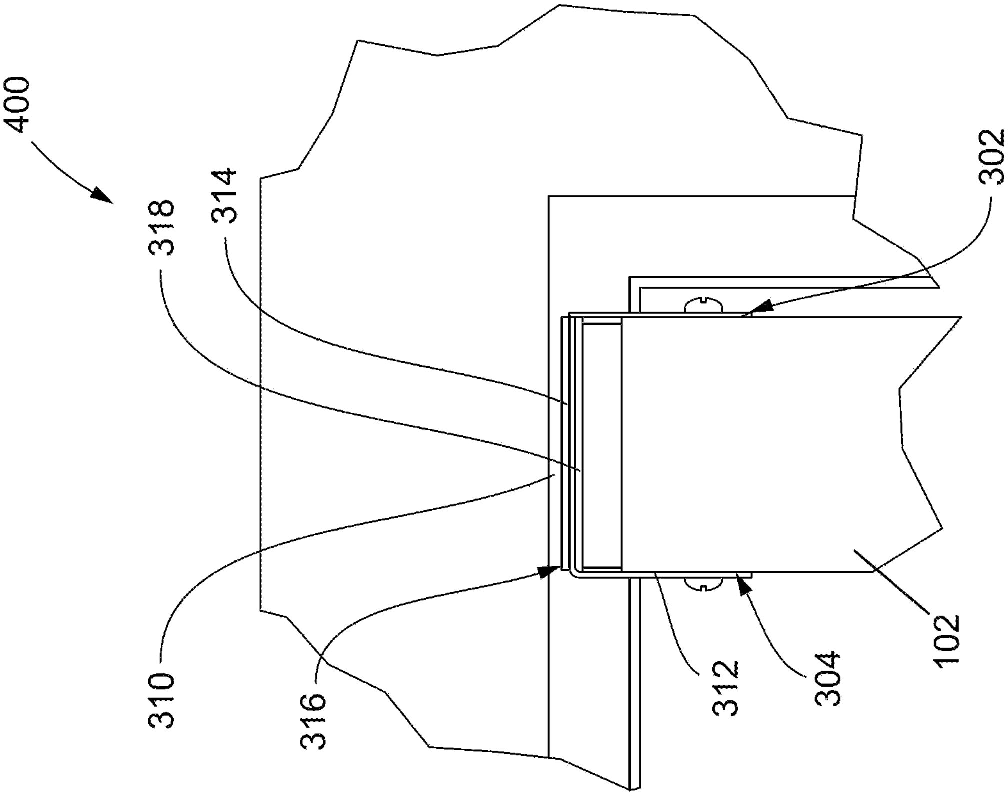
FIG. 11B illustrates a detailed view of a top corner of a fire door of the second embodiment, according to an exemplary aspect.
Figure 11A:
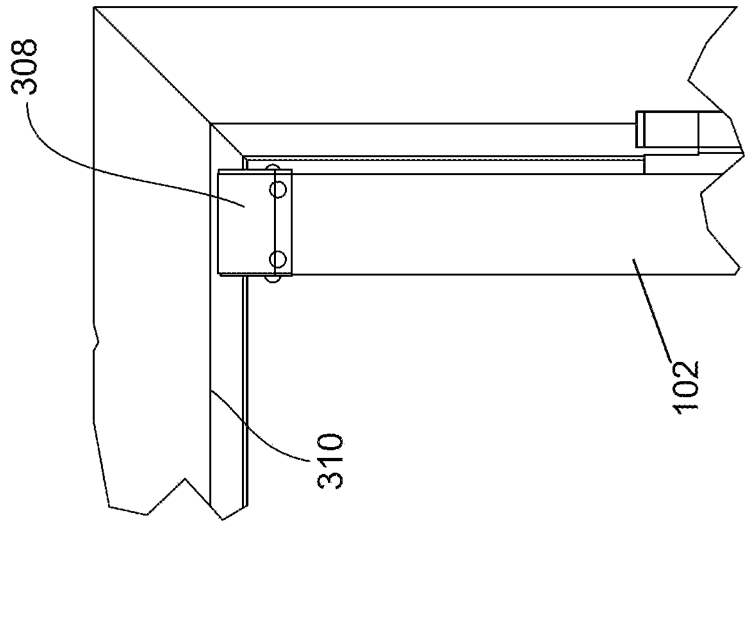
FIG. 11A illustrates a second embodiment of the door head system for fire doors with excessive door head clearances up to ½", according to an exemplary aspect.
Figure 14C:
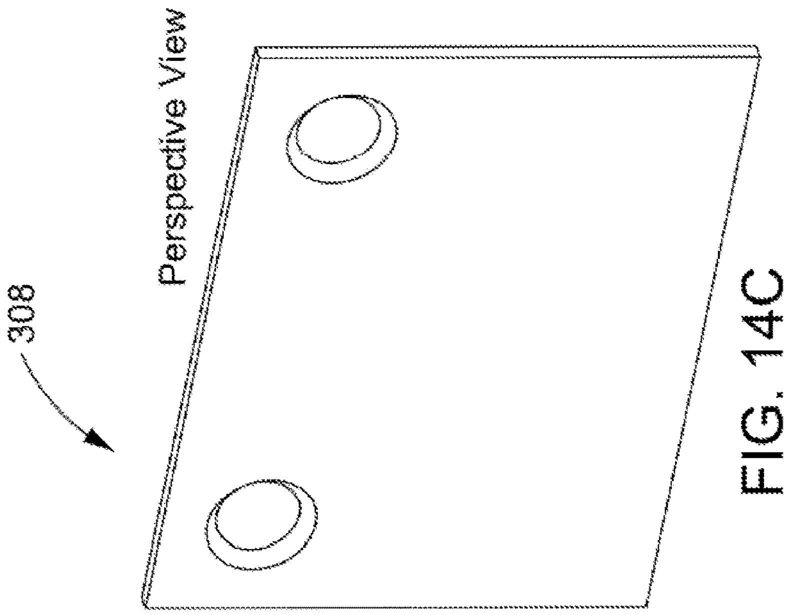

FIGS. 11A and 11B illustrate a door head system 400 for fire doors with excessive door head clearances up to ½", according to aspects of the present disclosure. Similar to system 300, system 400 may comprise a brushed stainless steel or steel door cap straight component 302 (as shown in FIGS. 12A-12D) mounted on a first side (e.g., pull side) of a fire door 102 that may be a wood or metal fire door, and a brushed stainless steel or steel door cap L-shaped component 304 (as shown in FIGS. 13A-13D) mounted on a second side (e.g., push side) of fire door 102 and fitted with two intumescent strip seals 316, 318. System 400 may also comprise end caps 308 (as shown in FIGS. 14A-14C) mounted on both side ends of fire door 102, and a number of sheet metal screws or any other suitable means for fastening all of the above-mentioned component pieces to the head portion of fire door 102. It should be appreciated that the installation of door cap straight component 302 and L-shaped component 304 on pull and/or push sides of fire door 102 may depend upon, amongst other things, the specific configuration and dimensions of fire door 102.

In comparison to system 300, system 400 may be implemented to rectify a greater door head clearance up to ½". In one embodiment, the horizontal portion 314 of L-shaped component 304 may be configured to hold or fitted with intumescent strip seals on its top and bottom sides, respectively. For example, as shown in FIG. 11B, each intumescent strip seal 316, 318 may be a 0.65 mm thick self-adhesive intumescent seal made of TECNOFIRE® 2000 or any suitable fire protection material. When exposed to high heat of a fire, the intumescent strip seals 316, 318 may expand to fill the openings between the horizontal portion 314, door frame 310, and top edge of door 102, thereby insulating the head portion of the door 102 and protecting it from deteriorating and failing during the fire. It should be appreciated that the specific thickness and/or width of the intumescent seals 316, 318 may be selected in connection with characteristics of the intumescent materials used such as expansion ratio, char porosity and thermal conductivity coefficient. The width of horizontal portion 314 may depend on the width of the intumescent strip seals 316, 318 and door 102. Preferably, the horizontal portion 314 is wide enough to hold the intumescent strip seals 316, 318 and span most of the top edge of door 102.

It should be appreciated that, although the horizontal portion 314 of L-shaped component 304 may be fitted with one or two intumescent strip seals described above with respect to FIGS. 10B and 11B, alternative embodiments of the present disclosure may require no intumescent strip seals to be fitted with the L-shaped component 304.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A system, comprising:

a first component installed on a first side of a fire door, wherein the first component comprises:

a vertical portion for mounting onto an outer surface of the first side of the fire door, and a horizontal portion inserted into a first gap between a top edge of the fire door and a door frame above the fire door or a second gap between a bottom edge of the fire door and a floor surface;

a second component installed on a second side of the fire door; and at least one intumescent strip seal fitted on the horizontal portion of the first component, wherein the at least one intumescent strip seal expands when exposed to high heat of a fire to fill at least a portion of the first gap or the second gap without causing movement of the first component, wherein, when the horizontal portion of the first component is inserted into the second gap, the at least one intumescent strip seal is fitted on a top side of the horizontal portion of the first component, such that the at least one intumescent strip seal expands upward when exposed to the high heat of the fire to fill space between the top side of the horizontal portion of the first component and the bottom edge of the fire door.

2. The system of claim 1, wherein, when the horizontal portion of the first component is inserted into the first gap, the first component is configured to maintain a first distance between the top side of the horizontal portion and the door frame above the fire door in accordance with a first selected distance.

3. The system of claim 1, wherein, when the horizontal portion of the first component is inserted into the second gap, the first component is configured to maintain a second distance between a bottom side of the horizontal portion and the floor surface in accordance with a second selected distance.

4. The system of claim 1, wherein the vertical portion of the first component is configured to receive a plurality of first fasteners in order to securely mount the first component to the outer surface of the first side of the fire door.

5. The system of claim 1, wherein the second component is configured to receive a plurality of second fasteners in order to securely mount the second component to the second side of the fire door.

6. The system of claim 1, further comprising end caps installed on two narrow ends of the fire door.

7. The system of claim 1, wherein a width of the horizontal portion of the first component is determined based at least upon a width of the at least one intumescent strip seal.

8. The system of claim 1, wherein a width of the horizontal portion of the first component is configured to cover a portion of the top edge or the bottom edge of the fire door.

9. A method, comprising:

installing a first component on a first side of a fire door, comprising:

mounting a vertical portion of the first component onto an outer surface of the first side of the fire door, and inserting a horizontal portion into a first gap between a top edge of the fire door and a door frame above the fire door or a second gap between a bottom edge of the fire door and a floor surface;

installing a second component on a second side of the fire door; and fitting at least one intumescent strip seal on the horizontal portion of the first component, wherein the least one intumescent strip seal expands when exposed to high heat of a fire to fill at least a portion of the first gap or the second gap without causing movement of the first component, wherein, when the horizontal portion of the first component is inserted into the second gap, the at least one intumescent strip seal is fitted on a top side of the horizontal portion of the first component, such that the at least one intumescent strip seal expands upward when exposed to the high heat of the fire to fill space between the top side of the horizontal portion of the first component and the bottom edge of the fire door.

10. The method of claim 9, further comprising:

determining a first distance between the top side of the horizontal portion and the door frame above the fire door in accordance with relevant fire door codes or regulations; and inserting the horizontal portion of the first component into the first gap to maintain the first selected distance when the fire door is exposed to the high heat of the fire.

11. The method of claim 9, further comprising:

determining a second distance between a bottom side of the horizontal portion and the floor surface in accordance with relevant fire door codes or regulations; and inserting the horizontal portion of the first component into the second gap to maintain the second selected distance when the fire door is exposed to the high heat of the fire.

12. The method of claim 9, further comprising receiving, by the vertical portion of the first component, a plurality of first fasteners in order to securely mount the first component to the outer surface of the first side of the fire door.

13. The method of claim 9, further comprising receiving, by the second component, a plurality of second fasteners in order to securely mount the second component to the second side of the fire door.

14. The method of claim 9, further comprising installing end caps on two narrow ends of the fire door.

15. The method of claim 9, further comprising determining a width of the horizontal portion of the first component based at least upon a width of the at least one intumescent strip seal.

16. The method of claim 9, wherein a width of the horizontal portion of the first component is configured to cover a portion of the top edge or the bottom edge of the fire door.

* * * * *